United States Patent
Katabi et al.

(10) Patent No.: US 9,961,495 B2
(45) Date of Patent: May 1, 2018

(54) SUB-DECIMETER RADIO FREQUENCY RANGING

(71) Applicant: Massachusetts Institute of Technology, Cambridge, MA (US)

(72) Inventors: Dina Katabi, Cambridge, MA (US);
Deepak Vasisht, Cambridge, MA (US);
Swarun Suresh Kumar, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days. days.

(21) Appl. No.: 15/072,592

(22) Filed: Mar. 17, 2016

(65) Prior Publication Data
US 2016/0277893 A1    Sep. 22, 2016

Related U.S. Application Data

(60) Provisional application No. 62/134,243, filed on Mar. 17, 2015.

(51) Int. Cl.
| | |
|---|---|
| *H04W 24/00* | (2009.01) |
| *H04W 4/02* | (2018.01) |
| *G01S 11/02* | (2010.01) |
| *H04L 12/26* | (2006.01) |

(52) U.S. Cl.
CPC ............ *H04W 4/023* (2013.01); *G01S 11/02* (2013.01); *H04L 43/0852* (2013.01)

(58) Field of Classification Search
CPC ..... H04L 43/0852; H04W 4/023; G01S 11/02
USPC ..................................................... 455/456.1
See application file for complete search history.

(56) References Cited

U.S. PATENT DOCUMENTS

| | | | | |
|---|---|---|---|---|
| 6,243,587 | B1* | 6/2001 | Dent ......................... | G01S 5/06 342/457 |
| 2010/0315291 | A1* | 12/2010 | Rakijas ................. | G01S 5/0009 342/387 |
| 2013/0181861 | A1* | 7/2013 | Zohar ..................... | G01S 1/725 342/118 |

(Continued)

FOREIGN PATENT DOCUMENTS

WO    2002/041029    5/2002

OTHER PUBLICATIONS

Gezici, et al. "Localization via ultra-wideband radios: a look at positioning aspects for future sensor networks." IEEE signal processing magazine 22, No. 4 (2005): 70-84.

(Continued)

*Primary Examiner* — Timothy Pham
(74) *Attorney, Agent, or Firm* — Occhiuti & Rohlicek LLP

(57) ABSTRACT

A system enables a single WiFi access point to localize clients to within tens of centimeters. Such a system can bring indoor positioning to homes and small businesses which typically have a single access point. A key enabler underlying the system is a novel algorithm that can compute sub-nanosecond time of flight using commodity WiFi cards. By multiplying the time of flight with the speed of light, a Wifi access point computes the distance between each of its antennas and the client, hence localizing it. An implementation on commodity WiFi cards demonstrates that the system's accuracy is comparable to state-of-the-art localization systems, which use four or five access points.

23 Claims, 5 Drawing Sheets

(56) References Cited

U.S. PATENT DOCUMENTS

2014/0087757 A1* 3/2014 Reimann ............... G01S 3/143
455/456.1
2015/0087329 A1* 3/2015 Stratford ............... H04W 64/00
455/456.1

OTHER PUBLICATIONS

Kotaru, et al. "Spotfi: Decimeter level localization using wifi." In ACM SIGCOMM Computer Communication Review, vol. 45, No. 4, pp. 269-282. ACM, 2015.
Kumar, et al. "Accurate indoor localization with zero start-up cost." In Proceedings of the 20th annual international conference on Mobile computing and networking, pp. 483-494. ACM, 2014.
Mariakakis, et al. "Sail: Single access point-based indoor localization." In Proceedings of the 12th annual international conference on Mobile systems, applications, and services, pp. 315-328. ACM, 2014.
Wang, et al. "Robust Chinese remainder theorem ranging method based on dual-frequency measurements." IEEE Transactions on Vehicular Technology 60, No. 8 (2011): 4094-4099.
Wang, et al. "An efficient ranging method for wireless sensor networks." In Acoustics Speech and Signal Processing (ICASSP), 2010 IEEE International Conference on, pp. 2846-2849. IEEE, 2010.
Xiong, et al "Arraytrack: A fine-grained indoor location system." Usenix, 2013.
Xiong, et al. "Synchronicity: pushing the envelope of fine-grained localization with distributed mimo." In Proceedings of the 1st ACM workshop on Hot topics in wireless, pp. 43-48. ACM, 2014.
Xiong, et al. "Tonetrack: Leveraging frequency-agile radios for time-based indoor wireless localization." In Proceedings of the 21st Annual International Conference on Mobile Computing and Networking, pp. 537-549. ACM, 2015.
Zheng, et al. "Accurate rogue access point localization leveraging fine-grained channel information." In Communications and Network Security (CNS), 2014 IEEE Conference on, pp. 211-219. IEEE, 2014.

* cited by examiner

SUB-DECIMETER RADIO FREQUENCY RANGING

CROSS-REFERENCE TO RELATED APPLICATIONS

This application claims the benefit of U.S. Provisional Application No. 62/134,243, filed Mar. 17, 2015, titled "Sub-Nanosecond Time of Flight on Commercial Wi-Fi Cards," which is incorporated herein by reference.

FEDERAL SPONSORSHIP

This invention was made with government support under contract FA8721-05-C-0002 awarded by the U.S. Air Force and under grant CNS1117194 awarded by the National Science Foundation. The government has certain rights in the invention.

BACKGROUND

This application relates to estimation of radio frequency propagation time ("time of flight") between radio transceivers, and more particularly relates to sub-decimeter range estimation between two wireless local area network ("WiFi") transceivers.

Radio frequency transmissions propagate at approximately $3 \times 10^8$ meters per second. Therefore, in order to use a propagation time to estimate a propagation distance to an accuracy of 0.1 meters (a decimeter), the time must be known to an accuracy of greater than 0.3 nanoseconds. That is, sub-nanosecond accuracy is necessary for such an approach to distance estimation.

Prior approaches have been presented to resolve time of flight to approximately 10 nanoseconds using the clocks of WiFi cards or other related methods. However, the accuracy of such approaches is insufficient for decimeter range accuracy.

One use of propagation time or distance estimation is localization. Others have attempted to use WiFi transceivers for sub-meter accuracy of localization. However, such prior approaches have not directly measured propagation time or distance between transceivers. For example, multiple reference transceivers are needed to infer a location of a target transceiver using differences in propagation time between different reference transceivers and a transceiver at an unknown location, rather than absolute propagation times, may be used to infer a location of a target transceiver. For example, such differences in propagation time may be used to determine direction of arrival, which in turn is used to determine the target location by triangulation.

State-of-the-art systems may achieve an accuracy of tens of centimeters, even using commodity WiFi chipsets. Such systems generally target enterprise networks, where multiple WiFi access points can combine their information and cooperate together to locate a target device. However, the vast majority of homes and small businesses today have a single WiFi access point and therefore such multiple-access-point approaches are not applicable.

There exist non-WiFi systems that can accurately measure the absolute time of flight, and hence localize using a single receiver. Such systems generally use specialized ultra wideband radios that span multiple giga-Hertz. Because time resolution is inversely related to the radio bandwidth, such devices can measure time of flight at sub-nanosecond accuracy, and hence localize an object to within tens of centimeters. In contrast, directly measuring time with a 20 or 40 mega-Hertz bandwidth equivalent to a WiFi radio transmission would result in errors of 7 to 15 meters using such techniques.

Prior work has failed to recognize and/or provide effective solutions to overcome effects that make it difficult to make accurate over-the-air propagation time estimates between two WiFi transceivers. These effects include:
  Limited transmission bandwidth
  Carrier frequency offset between transceivers
  Unknown packet detection delay at receivers
  Sampling frequency offset between transceivers
  Multiple propagation paths between transceivers There is a need to improve available technology for distance estimation, and in particular to overcome one or more of these effects to achieve improved time and/or distance accuracy.

SUMMARY

In one aspect, in general, embodiments presented herein improve on the technology of time-of-fight estimation by addressing one or more of the effects of carrier frequency offset (CFO) between transceivers, unknown packet detection delay at a receiver, sampling frequency offset (SFO) between transceivers, and multipath propagation between transceivers. At least some embodiments make use of two characteristics of communication packets that are transmitted between a pair of transceivers:

1. Communication packets that encode information on multiple sub-carriers over a relatively narrow bandwidth, for example, using orthogonal frequency division multiplexing (OFDM) encoding; and
2. Communication packets that are transmitted at widely separated carrier frequencies, for example, on multiple communication channels and/or on different communication bands, with the separation of the carrier frequencies being substantially greater than the bandwidth of any individual packet.

In another aspect, in general, multiple packets transmitted on different frequency bands are used to essentially emulate a wireband transmission. The measurements are "stitched" together to determine the propagation time. One or more embodiments overcome the following challenges to such stitching together of the transmissions:

1. Resolving Phase Offsets: To emulate a wideband radio, the system combines channel state information (CSI) captured by multiple packets, transmitted in different WiFi frequency bands, at different points in time. However, the very act of hopping between WiFi frequency bands introduces a random initial phase offset as the hardware resets to each new frequency (i.e., PLL locking). The system recovers time of flight to perform positioning despite these random phase offsets;
2. Eliminating Packet Detection Delay: Measurement of time of flight of a packet generally includes the delay in detecting its presence. Different packets however experience different random detection delays. To make matters worse, this packet detection delay is typically orders-of-magnitude greater than time of flight. For indoor WiFi environments, time of flight is just a few nanoseconds, while packet detection delay spans hundreds of nanoseconds. The system teases apart the time of flight from this detection delay; and
3. Combating Multipath: In indoor environments, signals do not experience a single time of flight, but a time-of-flight spread. This is because RF signals in indoor environments bounce off walls and furniture, and reach the receiver along multiple paths. As a result, the receiver obtains several copies of the signal, each having experienced a different time of flight. To perform accurate localization, the system disentangles the time of flight of the direct path from all the remaining paths.

In one aspect, in general, a method for determining a separation of two radio nodes includes receiving a first plurality of radio frequency transmissions from a second radio node to a first radio node. Each transmission includes a signal transmitted from the second radio node at a second location to the first radio node at a first location. The first location of the first radio and the second location are separated by a range. Each transmission has a transmission frequency different than the transmission frequencies of the other transmissions of the plurality of transmissions. A constraint on the range is determined from each of the transmissions, and each constraint is consistent with a plurality of possible ranges. The plurality of possible ranges of the constraint is dependent on the transmission frequency of the transmission. The constraints determined from each of the transmissions are then combined to determine an estimate of the range.

Aspects can include combinations of one or more of the following features.

Determining the constraint from a transmission comprises determining a phase difference at the transmission frequency between the signal transmitted at the second radio node and the signal received at the first radio node. The constraint on the range is the determined to be such that the range is substantially equal to a fraction of a wavelength plus a set of integer multiples of said wavelength, where the wavelength corresponds to the transmission frequency and the fraction corresponds to the determined phase difference.

The constraint on the range requires that a propagation time, $\tau$, corresponding to said range be equal to $-(\angle h_i)/(2\pi f_i)$ modulo $1/f_i$ for all the transmission frequencies $f_i$ of the transmissions and the corresponding determined phase differences $\angle h_i$.

Combining the constraints comprises determining a constraint on the range relative to a least common multiple of the wavelengths of the transmission frequencies.

Each signal of at least some of the plurality of transmissions includes a plurality of components at a set of distinct non-zero frequency offsets from the transmission frequency.

The phase difference at the transmission frequency is determined by determining a phase difference at each of the frequency offsets and then extrapolating the phases differences at said frequency offsets to determine the phase difference at the transmission frequency.

The signal comprises an Orthogonal Frequency Division Multiplexed (OFDM) modulation of data, and each component of the signal corresponds to a different component of the OFDM modulation.

The plurality of radio frequency transmissions comprise wireless local area network transmissions.

For each transmission from the second radio node to the first radio node, a transceiver frequency reference at the second radio node has a phase offset relative to a transceiver frequency reference at the first radio node.

Determining the phase difference comprises mitigate an effect of the phase offset of the transceiver frequency references at the first and first radio nodes.

Mitigating the effect of the phase offset in determining the phase difference at the transmission frequency of a first transmission of the plurality of transmissions includes: (a) recording a first measurement at the first radio node characterizing a first phase difference of the signal of the first transmission; (b) making a second transmission at the transmission frequency of the first transmission from the first radio node to the second radio node; (c) recording a second measurement characterizing a second phase difference of the signal of the second transmission at the second radio node; and (d) combining the first measurement and the second measurement to determine the phase difference between the second radio node and the first radio node at the transmission frequency.

The first phase difference includes an additive factor corresponding to the phase offset, and the second phase difference includes an additive factor that is substantially the negative of the additive factor of the first phase difference, and where combining the first measurement and the second measurement includes adding the first phase difference and the second phase difference.

Combining the first measurement and the second measurement further includes mitigating an effect of delay (e.g., a fixed hardware-related delay) between the first transmission and the second transmission.

Combining the first measurement and the second measurement include adding a factor corresponding to the delay between the first transmission and the second transmission.

Each transmission of at least some of the first plurality of transmissions has multiple paths between the second radio node and the first radio node including a direct path having direct propagation time corresponding to the range between the second radio node and the first radio node, and one or more indirect paths (e.g., reflecting off walls or other fixed structures in the environment) having indirect propagation times greater than said direct propagation time.

Each constrain corresponds to a value in a frequency domain representation of the propagation times as a function of transmission frequency.

Combining the constraints comprises performing a transform computation using the values in the frequency domain representation of the propagation times.

The transmission frequencies are non-uniformly spaced.

Performing the inverse transform computation comprises performing a Non-uniform Discrete Fourier Transform (NDFT) computation.

Combining the constraints to determine the estimate of the range comprises determining a peak in a time-domain representation resulting from the transform computation with a smallest time.

The plurality of radio frequency transmissions comprise wireless local area network transmissions.

The plurality of radio frequency transmissions comprise multiple channel frequencies in multiple frequency bands of a wireless communication system.

The plurality of radio frequency transmissions have transmission frequencies that span a range of at least a multiple of two between a lowest and a highest transmission frequency.

The plurality of radio frequency transmissions have transmission frequencies that are not multiples of a common transmission frequency.

The transmission frequencies are not all regularly spaced.

In another aspect, in general, software stored on a non-transitory machine-readable media comprising instructions for causing one or more processors to: (a) process a plurality of radio frequency transmissions from a second radio node, each transmission having a transmission frequency of the plurality of frequencies different than the transmission frequencies of the other transmissions of the plurality of transmissions; (b) determine a constraint on a range from the second radio node from each of the transmissions, each constraint being consistent with a plurality of possible ranges, the plurality of possible ranges of the constraint being dependent on the transmission frequency of the transmission; and (c) combine the constraints determined from each of the transmissions to determine an estimate of the range.

In another aspect, in general, software stored on a non-transitory machine-readable media comprising instructions for causing one or more processors to perform all the step of any one of the methods presented above.

In another aspect, in general, a radio node is configured to determining a separation from a second radio node. The node comprises a radio receiver configured to receive transmissions at a first plurality of frequencies and a processor. The processor is configured to: (a) process a first plurality of radio frequency transmissions from a second radio node, each transmission having a transmission frequency of the first plurality of frequencies different than the transmission frequencies of the other transmissions of the plurality of transmissions; (b) determine a constraint on a range from the second radio node from each of the transmissions, each constraint being consistent with a plurality of possible ranges, the plurality of possible ranges of the constraint being dependent on the transmission frequency of the transmission; and (c) combine the constraints determined from each of the transmissions to determine an estimate of the range.

In another aspect, in general, a radio node is configured to determining a separation from a second radio node. The node comprises (a) a radio receiver configured to receive transmissions at a first plurality of frequencies; and (b) a processor configured to perform all the step of any one of the methods presented above.

In another aspect, in general, a system includes a plurality of nodes, including a first node and a second node, configured to determine a range between said nodes according to any one of the methods presented above. In some examples, the first node is a WiFi access point and the second node is a mobile WiFi device.

In another aspect, in general, a system includes a plurality of nodes. The nodes are configured to determined ranges between pairs of nodes according to any one of the methods presented above. Locations of the nodes (e.g., relative to one another) are then determined from the determined ranges.

An advantage of one or more embodiments is that a single WiFi node (e.g., an access point) can determine a position relative to (i.e., localize) and/or determine a range to another node without support from additional infrastructure. Further, the approach can be deployed on commodity WiFi Network Interface Controllers (NICs) and does not require additional sensors (cameras, accelerometers, etc.).

DETAILED DESCRIPTION

Notation

The following notation is generally used in the description below. In the case of inconsistency between this list and the text of the description, text should be followed.

$\tau$ is the true propagation time (time of flight) between two nodes. In the case of multiple paths, $\tau_0$ denotes the time on a direct path, and $\tau_p$ denotes the delay on the $p^{th}$ indirect path.

d is the true range between the nodes, $d=c/\tau$ where c is the propagation speed.

$f_0$ is the frequency of local oscillator, which determines the carrier frequency of a transmission (in Hertz).

tx rx In general, superscript $^{tx}$ denotes a quantity at the node initiating a range measurement (i.e., the transmitter of an initial packet) and superscript $^{rx}$ denotes the quantity at the node to which the range is being determined. In general, an optional initial subscript i denotes a quantity for an $i^{th}$ measurement ($1 \le i \le N$). For example, $f_{i,0}^{rx}$ denotes the local oscillator frequency at a receiver on the $i^{th}$ measurement (e.g., at the $i^{th}$ frequency band).

$\varphi_0$ is the phase of the corresponding oscillator (in degrees).

$f_k$ is the frequency of the $k^{th}$ subcarrier ($1 \le k \le K$) of a transmission (i.e., the first subcarrier is spaced $f_1-f_0$ from the carrier of the transmission). When presented with two indices as $f_{i,k}$, the first index i denotes the channel of the transmission and the second index, k, denotes the subcarrier.

$h_k$ is the true over-the-air propagation channel of the $k^{th}$ subcarrier. The phase of the channel is denoted $\angle h_k$ (in Radians). In the case of a pure delay and no indirect paths, then $\angle h_0 = -2\pi f_0 \tau \mod 2\pi$. When presented with two indices as $h_{i,k}$, the first index i denotes the channel of the transmission and the second index, k, denotes the subcarrier.

$\delta$ is the packet detection time delay.

$\tilde{h}_k$ is a channel estimate for the $k^{th}$ subcarrier including the effect of the packet detection delay. In the case of a pure delay and no indirect paths, then $\angle \tilde{h}_0 = -2\pi f_0(\tau+\delta) \mod 2\pi$.

1 System Overview

Figure 1:
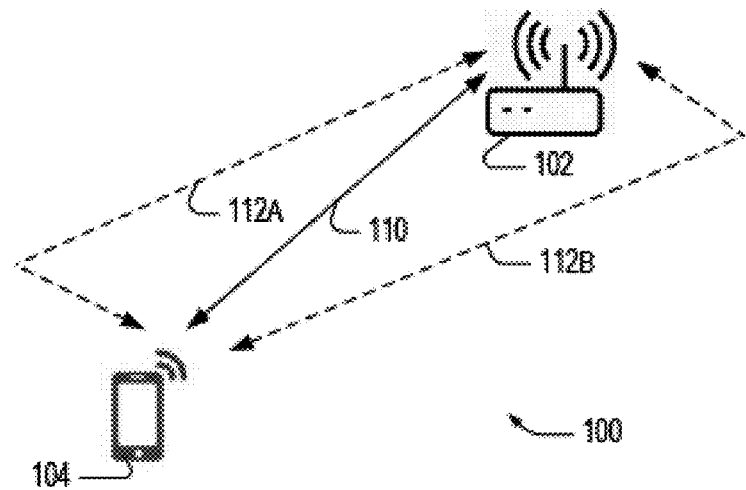
FIG. 1 is an illustration of an indoor environment in which a distance between two wireless nodes is estimated using transmissions between the nodes.
Figure 2:
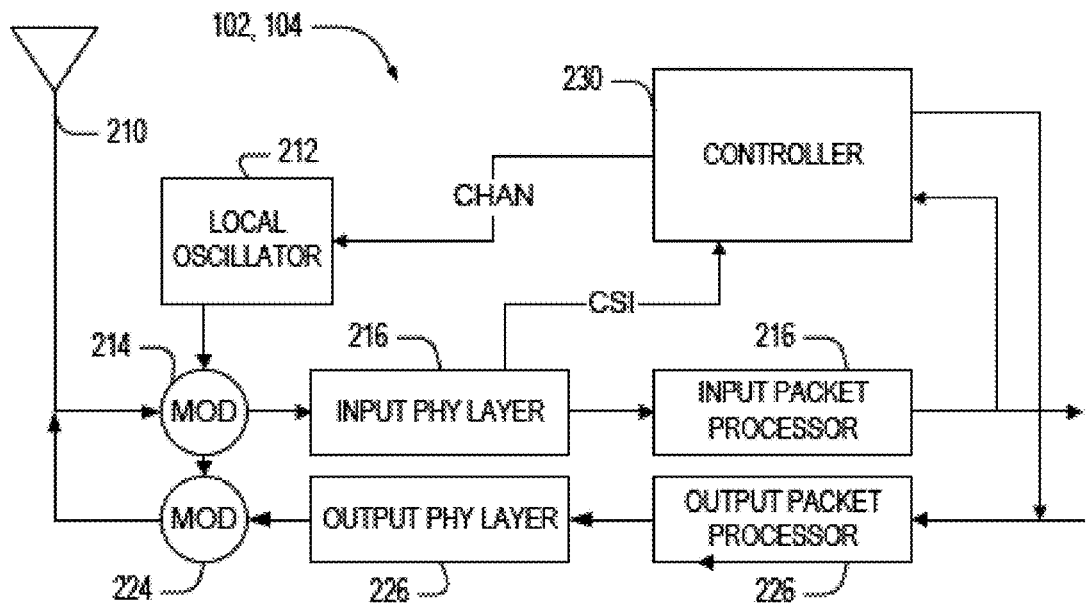
FIG. 2 is a block diagram of components of the wireless nodes shown in FIG. 1.
Figure 3:
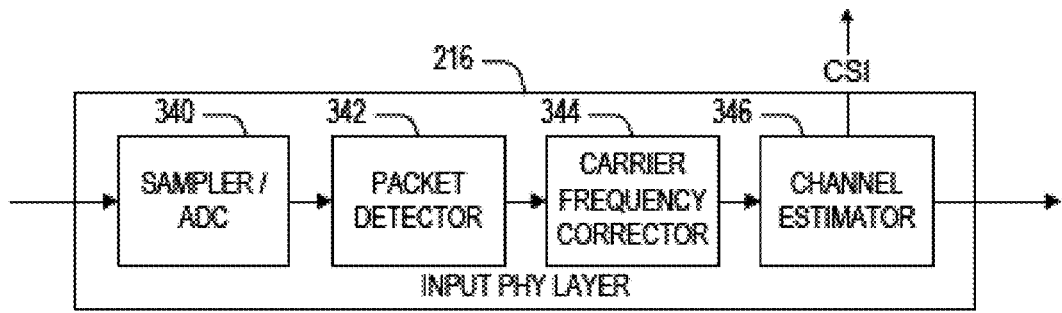
FIG. 3 is a block diagram of an input physical layer ("PHY") shown in FIG. 2.

FIGS. 1-3 illustrate general characteristics of a system 100 for determining the separation of WiFi nodes 102, 104. Referring to FIG. 1, in this example, the nodes 102, 104 comprise an access point 102 and a handheld device (e.g., smartphone) 104. The system makes use of communication packets transmitted between the nodes the over the over-the-air path 110 between the nodes. The direct over-the-air path 110 is shown as a solid line, and a number of indirect paths 112A-B, which are longer than the direct path 110, reflecting off objects in the environment, are shown as dashed lines. As discussed further below, the system 100 makes use of computation components (e.g., computers, embedded processors or controllers, using software stored on media, etc.) hosted at one or both of the nodes 102, 104, and optionally further uses computation resources not illustrated in FIG. 1 (e.g., at a computation server linked to the access point 102). Very generally, the system makes use of propagation times τ on the direct path 110, along with the known signal propation speed (c), to determine the range of node 104 from node 102.

Referring to FIG. 2, each of the nodes 102, 104 includes a number of packet processing components, including a controller 230. The controllers 230 at the nodes cooperate to determine the range estimate. Each node includes a local oscillator 212, which is responsive to a channel setting command to provide a reference (e.g., local oscillator) signal at a frequency $f_0$ to a demodulator 214 for inbound transmissions and a modulator 224 for outbound transmissions, both coupled to an antenna 210. The output of the demodulator 214 comprises a baseband signal that is provided to the input phy layer 216, which in turn provides data packets to input packet processor 216. On the output path, an output packet processor 226 provides data packets to the output phy layer 226, which in turn passes a baseband signal via the modulator 224 to the antenna 210.

In a number of embodiments described below, the transmissions between nodes make use of multiple sub-carriers. In particular, a number of embodiments make use of orthogonal frequency division multiplexing (OFDM) in which each transmission packet includes a sequence of symbols, and each symbol is encoded as a sum of modulated subcarriers at orthogonal frequencies. Each transmission packet also includes a preamble, which is used for detection of the packet at the receiver, and as described below, may be used for compensating for differences in local oscillator frequency between the transmitter and receiver. Referring to FIG. 3 the input phy layer 216 includes a sampler and analog-to-digital converter (ADC), which provides a sequence of complex values (i.e., the two quadrature components of the demodulated baseband signal). This sequence is provided to a packet detector 342. In some implementations, the packet detector makes use of a repeating pattern in the preamble to detect the start of a data packet. Note that the detection is not in general precise, and the time of detection generally lags the true start of the received packet by δ seconds.

As introduced above, the input phy layer 344 also includes a carrier frequency corrector 344. Generally, there is a difference between the local oscillator frequency $f_0^{tx}$ at the transmitter, and the local oscillator frequency $f_0^{rx}$, and the carrier offset corrector essentially introduces a correction exp$(-j\beta n)$, where $\beta=2\pi(f_0^{rx}-f_0^{tx})t_s$ where $t_s$ is the sampling time of the sampler 340. This correction effectively corrects for divergence of the oscillator frequencies over the duration of the received packet (i.e., it corrects the "rotating phase" exhibited during the packet). Note that if the oscillators are at the same frequency (although they may be at different phase) then no modification of the samples.

Each packet includes a number of known values modulated at different subcarriers. A channel estimator 346 reports the complex transformations $CSI_k$ of the known values to the demodulated values at subcarriers $f_k$ received after the carrier frequency corrector 344. As discussed further below, the phases of the values $CSI_k$ depend on the propagation time τ, the packet detection delay δ, as well as an initial phase difference of the local oscillators at the time the packet was detected, and the magnitudes depend on the gain of the path (including amplification gain and over-the-air attenuation, etc.). Therefore the $CSI_k$ values cannot in general be used directly to estimate the propagation time τ alone, and therefore cannot be used directly to estimate the range between nodes. However, with appropriate processing described below, the $CSI_k$ values do yield an accurate range estimate.

2 Propagation Time

Before describing the details of how to determine channel phase $\angle h_{i,0}$ at each of the carrier frequencies $f_{i,0}$ for i=1, ..., N, the approach to determining the range d from the phases is described in this Section. From basic electromagnetics, it is known that as a signal propagates in time, it accumulates a corresponding phase depending on its frequency. The higher the frequency of the signal, the faster the phase accumulates. To illustrate, let us consider a transmitter sending a signal to its receiver. Then we can write the wireless channel h as:

$$h = a\exp(-j2\pi f\tau), \quad (1)$$

where a is the (real valued) signal magnitude, f is the frequency and τ is the time of flight. The phase of this channel depends on time of flight as:

$$\angle h = -2\pi f\tau \bmod 2\pi \quad (2)$$

Notice that the above equation depends directly on the signal's time of flight, and does not depend on the signal's precise time-of-departure at the transmitter. Hence, we can use Eqn. 2 above to measure the time of flight τ as:

$$\tau = -\frac{\angle h}{2\pi f} \quad (3)$$

$$\bmod \frac{1}{f}$$

The above equation gives us the time of flight modulo 1/f. Hence, for a single transmission at WiFi frequency of 2.4 GHz, we can only obtain the time of flight modulo 0.4 nanoseconds (ns). Said differently, transmitters with times-of-flight 0.1 ns, 0.5 ns, 0.9 ns, 1.3 ns, etc. would all produce identical phase in the wireless channel. In terms of physical distances, this means transmitters at distances separated by multiples of 12 cm (e.g., 3 cm, 15 cm, 27 cm, 39 cm, etc.) all result in the same channel phase. Consequently, there is no way to distinguish between these transmitters using the phase on a single frequency band alone.

As introduced above, the system makes use of multiple transmission bands, and hops between multiple frequency bands with carrier frequencies $\{f_{1,0}, ..., f_{N,0}\}$ and measure the corresponding wireless channels $\{h_{1,0}, ..., h_{N,0}\}$. (For the remainder of this Section, the subscript 0 denoting the carrier frequency is omitted for brevity).

The result is set of constraints (e.g., a system of equations), one per frequency, that measure the time of flight modulo different values:

$$\forall i \in \{1, 2, ..., N\} \quad (4)$$

$$\tau = -\frac{\angle h_i}{2\pi f_i}$$

-continued $$\mod \frac{1}{f_i}$$

This set of equalities can be solved algebraically to determine τ modulo the Least Common Multiple (LCM) of $\{1/f_1, \ldots, 1/f_N\}$. For instance, the system can resolve time of flight uniquely modulo 200 ns using WiFi frequency bands around 2.4 GHz. That is, a the system receiver can resolve transmitters within a radius of 60 m.

Figure 4:
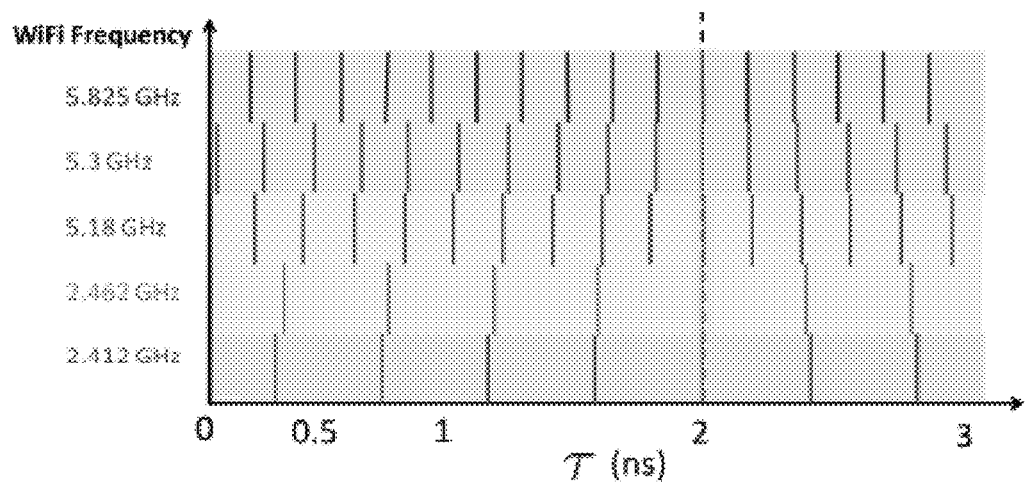
FIG. 4 is an illustration of an approach to combining modular time estimates at different frequencies.

To illustrate how the above system of equations works, consider a transmitter at 0.6 m distance from a receiver, resulting in a time of flight of 2 ns. Say the receiver measures the channel phases from this source on five candidate WiFi frequency bands as shown in FIG. 4. We note that a measurement on each of these channels produces a unique equation for τ, like in Eqn. 4. Each equation has multiple solutions, depicted as vertical lines in FIG. 4. However, only the correct solution of τ will satisfy all equations. Hence, by picking the solution satisfying the most number of equations (i.e., the τ with most number of aligned lines in FIG. 4), we can recover the true time of flight of 2 ns.

Note that the solution makes no assumptions on whether the set of frequencies $\{f_1, \ldots, f_n\}$ are equally separated or otherwise. In fact, having unequally separated frequencies makes them less likely to share common factors, boosting the LCM. Thus, counter-intuitively, the scattered and unequally-separated bands of WiFi are not a challenge, but an opportunity to resolve larger values of τ.

Specifically, the procedure for computing τ modulo the LCM is as follows:
1. LCM←Least Common Multiple of $\{1/f_1, \ldots, 1/f_N\}$
2. compute τ modulo LCM as $$\tau = \sum_i \left(-\frac{\angle h_i}{2\pi f_i}\right)\left(\frac{LCM}{(1/f_i)}\right) \mod LCM \quad (5)$$

$$= LCM \sum_i \left(-\frac{\angle h_i}{2\pi}\right) \mod LCM \quad (6)$$

An alternative procedure for determining τ makes use of a sparse Fourier Transform. In situations in which there are indirect paths between the wireless nodes, for P indirect paths, the channels have the form $h_i = \sum_{p=0}^{P} a_{i,p} \exp(-j2\pi f_i \tau_p)$. For the purpose of this computation, it is assumed that the magnitudes $a_{i,p}$ do not depend on the band i. A sparse Fourier Transform to find the peaks at $\tau_0, \ldots, \tau_P$, with the smallest time $\tau_0$ corresponding to the direct path, which is used to determine the range between the nodes.

3 Packet Detection Delay

In the discussion in this section, we assume that the frequency reference signals (e.g., local oscillator signals) at the transmitter and at the receiver are fully synchronized in frequency and phase, and the focus of this section is on mitigation of the effect of the delay in packet detection.

As discussed above, time of flight can be computed based on the channels $h_i$ (more specifically the phase of the channels) that signals experience when propagating over the air on different frequencies $f_i$. In practice however, there is a difference between the channel over the air, $h_i$, and the channel as measured by the receiver, $\tilde{h}_i$. Specifically, the measured channel at the receiver, $\tilde{h}_i$, experiences a delay in addition to time of flight: the delay in detecting the presence of a packet. This delay occurs because WiFi receivers detect the presence of a packet based on the energy of its first few time samples. The number of samples that the receiver needs to cross its energy detection threshold varies based on the power of the received signal, as well as noise. While this variation may seem small, packet detection delays are often an order of magnitude larger than time of flight, particularly in indoor environments, where time of flight is just a few tens of nanoseconds Hence, accounting for packet detection delay is very important for accurate time-of-flight and distance measurements.

The system therefore derives the true channel $h_i$ (which incorporates the time of flight alone) from the measured channel $\tilde{h}_i$ (which incorporates both time-of-flight and packet detection delay). To do this, the system exploit the fact that WiFi uses OFDM. Specifically, the bits of WiFi packets are transmitted in the frequency domain on several small frequency bins called OFDM subcarriers. This means that the wireless channels $\tilde{h}_i$ can be measured on each subcarrier. The approach described in more detail below takes advantage of the observation that the measured channel at subcarrier-0 does not experience packet detection delay, i.e., it is identical in phase to the true channel at subcarrier 0.

To see why this observation is true, note that while time-of-flight and packet detection delay appear very similar, they occur at different stages of a signal's lifetime. Specifically, time of flight occurs while the signal is transmitted over the air (i.e., in passband). In contrast, packet detection delay stems from energy detection that occurs in digital processing once the carrier frequency has been removed (in baseband). Thus, time-of-flight and packet detection delay affect the wireless OFDM channels in different ways.

To understand this difference, consider the WiFi frequency channel, i. Let $\tilde{h}_{i,k}$ be the measured channel of OFDM subcarrier k, at frequency $f_{i,k}$. The channel $\tilde{h}_{i,k}$ experiences two phase rotations in different stages of the signal's lifetime:

a phase rotation in the air proportional to the over-the-air frequency $f_{i,k}$. From Eqn. 2 above, this phase value for a frequency $f_{i,k}$ is $$\angle h_{i,k} = -2\pi f_{i,k}\tau,$$

where τ is the time of flight.

an additional phase rotation due to packet detection after the removal of the carrier frequency. This additional phase rotation can be expressed as:

$$\Delta_{i,k} = -2\pi(f_{i,k} - f_{i,0})\delta_i,$$

where $\delta_i$ is the packet detection delay; and

Thus, the total measured channel phase at subcarrier k is:

$$\angle \tilde{h}_{i,k} = \angle h_{i,k} + \Delta_{i,k} \quad (7)$$

$$= -2\pi f_{i,k}\tau - 2\pi(f_{i,k} - f_{i,0})\delta_i \quad (8)$$

Notice from the above equation that the second term $\Delta_{i,k} = -2\pi(f_{i,k} - f_{i,0})\delta_i$ is zero at k=0. In other words, at the zero-subcarrier of OFDM, the measured channel $\tilde{h}_{i,k}$ is identical in phase to the true channel $h_{i,k}$ over-the-air which validates our claim.

In practice, this means that we can combine the phases and the derived modular time delay estimate (i.e., time delay modulo a constant) based on the the zero-subcarriers (i.e. center frequencies) of the channels on each of the WiFi frequency bands. In the U.S., WiFi at the 2.4 GHz and 5 GHz bands has a total of 35 WiFi channels with independent channel (i.e., center) frequencies. (Including the DFS bands at 5 GHz in the U.S. which are supported by many 802.11h-compatible 802.11n radios, e.g., the Intel 5300.) Therefore, a sweep of all WiFi frequency bands results in 35 independent equations which can be used to recover time of flight.

However, the channel of the zero subcarrier is not directly available. This is because WiFi transmitters do not in general send data on the zero-subcarrier, meaning that this channel simply cannot be measured directly at the receiver. (One reason that WiFi transmitters may not send data at the zero-subcarrier is that it overlaps with DC offsets in hardware, which can be difficult to remove.)

Rather than measure the channel of the zero subcarrier directly, the system makes use of the remaining WiFi OFDM subcarriers, where signals are transmitted. Specifically, it leverages the fact that indoor wireless channels are based on physical phenomena. Hence, they are continuous over a small number of OFDM subcarriers. This means that the system can interpolate and/or extrapolate the measured channel phase across all subcarriers to estimate the missing phase at the zero-subcarrier.

Although Eqn. 8 shows that $\angle \tilde{h}_{i,k}$ varies linearly with $f_{i,k}$ as k varies, a robust interpolation approach uses cubic spline interpolation (i.e., assuming a cubic relationship rather than linear relationship in $f_{i,k}$ to extrapolate to $f_{i,0}$), however other approaches can be used. According to the the 802.11n standard a receiver measures wireless channels on as many as 30 subcarriers on each WiFi channel. Hence, interpolating between the subcarriers not only helps the system retrieve the measured channel on the zero-subcarrier, but also provides additional resilience to noise.

To summarize, the system applies the following steps to account for packet detection delay: (1) It obtains the measured wireless channels on the 30 subcarriers on the 35 available WiFi channels; (2) It interpolates between these subcarriers to obtain the measured channel phase on the zero-subcarriers on each of these channels, which is unaffected by packet detection delay. (3) It retrieves the time of flight using the resulting 35 channels using the approach described above.

4 Phase and Frequency Offset

To work with practical WiFi radios, the system also addresses inherent phase and frequency offsets in the local oscillators at the transmitter and receiver of a packet. These offsets include:

PLL Phase Offset: Frequency hopping causes a random phase offset in the measured channel. This is because the phase-locked loop (PLL) responsible for generating the center frequency for the transmitter and the receiver starts at random initial phase (say, $\varphi_{i,0}^{tx}$ and $\varphi_{i,0}^{rx}$ respectively). As a result, the channel measured at the receiver is corrupted by an additional phase offset $\varphi_{i,0}^{tx}-\varphi_{i,0}^{rx}$. This phase offset, if left uncorrected, could render the phase information uncorrelated with the time-of-flight of the signal; and Carrier Frequency Offset: This offset occurs due to small differences in the carrier frequency of the transmitting and receiving radio. This leads to a time varying phase offset across each frequency band. Such differences accumulate quickly over time and need to be corrected for every WiFi packet. Mathematically, in the $i^{th}$ WiFi channel, the receiver center frequency $f_{i,0}^{rx}$ is slightly different from the transmitter center frequency, $f_{i,0}^{tx}$. As a result, the channel measurements at the receiver have an additional phase change which is proportional to $f_{i,0}^{tx}-f_{i,0}^{rx}$.

Let us refer to the channel values that incorporate phase and frequency offsets as CSI (Channel State Information), which is the typical term used in communication systems. Then, the CSI measured at the receiver for the $i^{th}$ frequency band can be written as:

$$CSI_{i,0}^{rx}(t)=\tilde{h}_{i,0}\exp(j(f_{i,0}^{tx}-f_{i,0}^{rx})t+j(\varphi_{i,0}^{tx}-\varphi_{i,0}^{rx})) \quad (9)$$

To mitigate the effect or phase and frequency offset, the system exploits the observation that the phase and frequency offsets measured on one node with respect to another change sign when measured on the second node with respect to the first. Thus, if one would measure the CSI on the transmitter with respect to the receiver, it would take the following value:

$$CSI_{i,0}^{tx}(t)=\tilde{h}_{i,0}\exp(j(f_{i,0}^{rx}-f_{i,0}^{tx})t+j(\varphi_{i,0}^{rx}-\varphi_{i,0}^{tx})). \quad (10)$$

Note that the channel, $\tilde{h}_{i,0}$, in equations 9 and 10 is the same due to reciprocity. We can therefore multiply the CSI measurements at the receiver and the transmitter to recover the wireless channel as follows:

$$\tilde{h}_{i,0}^2 = CSI_{i,0}^{rx}(t)CSI_{i,0}^{tx}(t) \quad (11)$$

Measuring the CSI at the transmitter makes use of the fact that the nodes transmits packets back and forth to one another. Hence, the CSI can be measured on both sides and exchanged to apply Eqn. 11.

The above formulation provides the square of the wireless channels $\tilde{h}_{i,0}^2$, which has a phase that is double that of $\tilde{h}_{i,0}$. Therefore, using the squared channel in place of the channel to determine the modular times, which are combined over frequency bands yields twice the propagation delay.

In practice, the forward and reverse channels cannot be measured at exactly the same t but within short time separations (tens of microseconds), resulting in a small phase error. However, this error is significantly smaller than the error from not compensating for frequency offsets altogether (for tens of milliseconds). The error can be resolved by averaging over several packets.

A second observation is that delays in the hardware (e.g., due to wire lengths, component delays, etc., distinct from delay resulting from packet detection delay) result in a constant additive value to the time-of-flight. This constant is pre-calibrated once in the lifetime of a device, for example, by measuring time-of-flight to a device at a known distance.

5 Multipath

Figure 5:
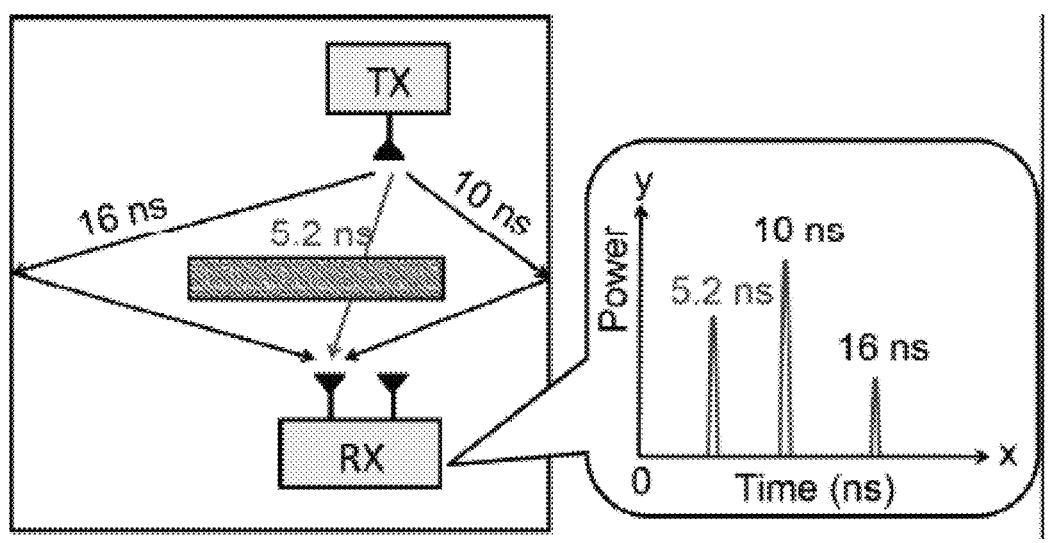
FIG. 5 is an illustration of multiple transmission paths with attenuation.

The discussion above has focussed on the nodes communicating directly, for example as illustrated in FIG. 1 on a path 110. However, indoor environments are rich in multipath, causing wireless signals to bounce off objects in the environment like walls and furniture. In FIG. 1 the signal travels along indirect paths 112A-B from its sender to receiver. The signals on each of these paths propagate over the air incurring different time delays as well as different attenuations. The ultimate received signal is therefore the sum of these multiple signal copies, each having experienced a different propagation delay. FIG. 5 shows a similar situation as shown in FIG. 1. In this example, the most direct path, with propagation time of 5.2 ns is attenuated relative to indirect paths with times of 10 ns and 16 ns respectively.

Consider a situation in which wireless signals from a transmitter reach a receiver along p different paths. The received signal from each path corresponds to amplitudes $\{a_1, \ldots, a_p\}$ and propagation delays $\{\tau_1, \ldots, \tau_p\}$. Observe that Eqn. 1 considers only a single path experiencing propagation delay and attenuation. In the presence of multipath, we can extend this equation to write the measured channel $\tilde{h}_{1,0}$ on the zero subcarrier (i.e., center-frequency) $f_{i,0}$ as the sum of the channels on each of these paths, i.e.:

$$\tilde{h}_{i,0} = \sum_{k=1}^{p} a_k \exp(-j2\pi f_{i,0}\tau_k), \quad (12)$$

for $i = 1, \ldots, n$

The system "disentangles" these different paths and recovers their propagation delays. To do this, notice that the above equation has a familiar form of a Discrete Fourier Transform. Thus, if one could obtain the channel measurements at many uniformly-spaced frequencies, a simple inverse-Fourier transform would separate individual paths. Such an inverse Fourier transform has a closed-form expression that can be used to obtain the propagation delay of all paths and compute the multipath profile (up to a resolution defined by the bandwidth).

WiFi frequency channels, however, are not equally spaced—they are scattered around 2.4 GHz and multiple non-contiguous frequency ranges at 5 GHz. While we can measure $\tilde{h}_{1,0}$ at each WiFi band, these measurements will not be at equally spaced frequencies and hence cannot be simply used to compute the inverse Fourier transform. In fact, since the measurements of the channels are not uniformly spaced, we are dealing with the Non-uniform Discrete Fourier Transform or NDFT. To recover the multipath profile, the system inverts the NDFT. An approach to the NDFT computation is provided in the Appendix.

Inverting the NDFT provides the system with the time of flight on all paths. The system still needs to identify the direct path so that it can compute the distance between transmitter and receiver. To do this, the system leverages the observation that of all the paths of the wireless signal, the direct path is the shortest. Hence, the time of flight of the direct path is the propagation delay corresponding to the first peak in the multipath profile.

It is worth noting that by making the sparsity assumption, we lose the propagation delays of extremely weak paths in the multipath profile. However, the system only needs the propagation delay of the direct path. As long as this path is among the dominant signal paths, the system can retrieve it accurately. Of course, in some unlikely scenarios, the direct path may be too attenuated, which leads to poorer localization in that instance. Our results (see, e.g., FIG. 8) depict the sparsity of representative multipath profiles, and show its impact on overall accuracy.

6 Results

An embodiment of the system was implemented as a software patch to the iwlwifi driver on Ubuntu Linux running the 3.5.7 kernel. To measure channel-state-information, the 802.11 CSI Tool for the Intel 5300 WiFi card was used. Channels on both 2.4 GHz and 5 GHz WiFi bands were measured. Note that the Intel 5300 WiFi card is known to have a firmware issue on the 2.4 GHz bands that causes it to report the phase of the channel $\angle \tilde{h}_{i,0}$ modulo $\pi/2$ (instead of the phase modulo $2\pi$). This issue was resolved by performing the system's algorithm at 2.4 GHz on $\tilde{h}_{i,0}^4$ instead of $\tilde{h}_{1,0}$. This does not affect the fact that the direct path of the signal will continue being the first peak in the inverse NDFT.

It should be understood that this implementation is just as example. Other implementations, which may use hardware, software, or a combination of hardware and software, may be used. The described procedures may be implemented in software, which includes instructions stored on a non-transitory machine-readable medium, and this software can control a processor at a node, or at a remote server, to perform the procedures. In addition, some of the functions may be implemented in hardware, for instance, using Application Specific Integrated Circuits (ASICs).

Unless specified otherwise, two the system devices (nodes) were paired by placing each device in monitor mode with packet injection support on the same WiFi frequency. The system's frequency band hopping protocol was implemented in the iwlwifi driver using high resolution timers (hrtimers), which can schedule kernel tasks such as packet transmits at microsecond granularity. Since the 802.11 CSI Tool does not report channel state information for Link-Layer ACKs received by the card, we use packet injection to create and transmit special acknowledgments directly from the iwlwifi driver to minimize delay between packets and acknowledgments. These acknowledgments are also used to signal the next channel that the devices should hop to. Finally, the channel state information was processed to infer time-of-flight and device locations purely in software written in part in C++, MEX and MATLAB.

Figure 6:
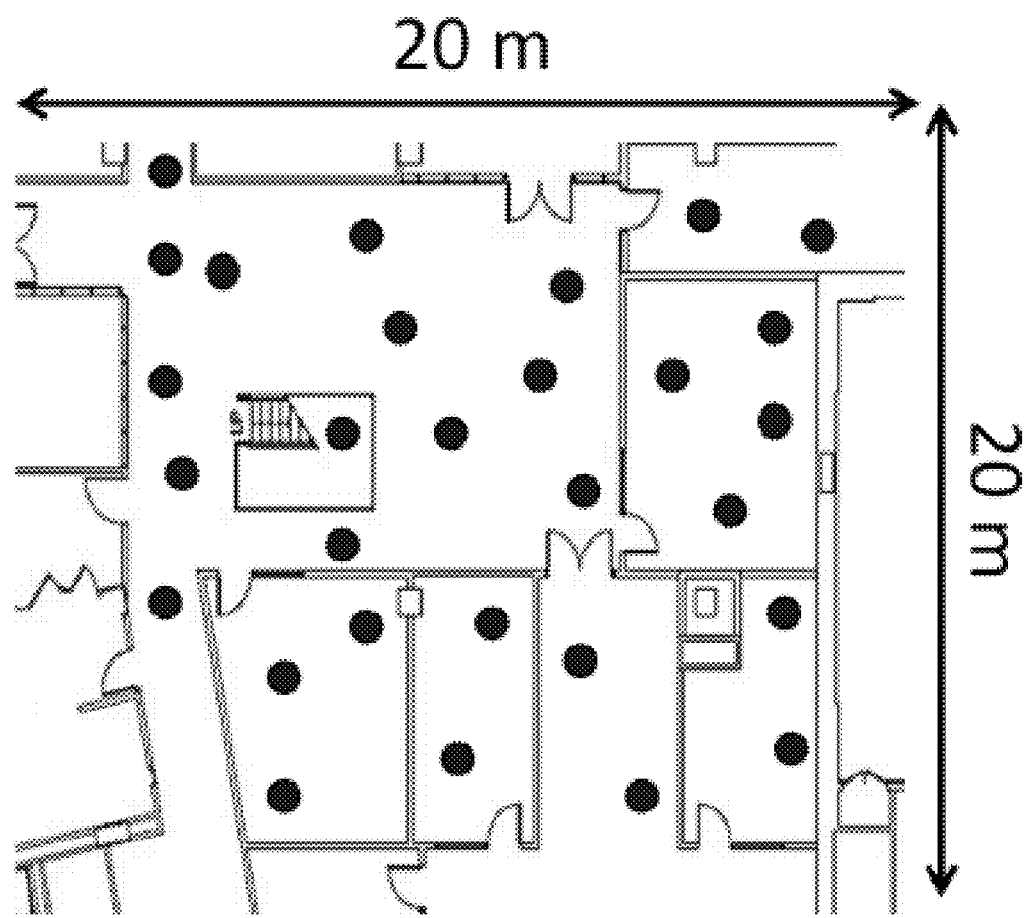
FIG. 6 is a testbed with candidate locations for the nodes marked with dots.

The system's ability to measure the time-of-flight, and compute a client's position were evaluated using using a single access point. The system was tested using the testbed shown in FIG. 6. The Figure shows a number of nodes, indicated by dots, distributed in a multiple room environment of approximately 20 meters square. In each experiment, a location for the access point was randomly picked, and then a client location that is within 15 meter from the access point was picked. Experiment with both line-of-sight and non-line-of-sight settings were conducted. The experiments were conducted using a 10" ASUS EEPC netbook as a user device and a Thinkpad W300 Laptop emulating a WiFi access point via hostapd. Both devices were equipped with the 3-antenna Intel 5300 chipset. The antennas were placed at the corner of each device, which results an average antenna spacing of 30 cm for the Thinkpad access point and 12 cm for the ASUS client.

Using the above setup, 400 localization experiments were conducted for different AP-client pairs. For each pair, a channel hopping protocol was used to sample the different frequencies. The time of flight between each transmit antenna and receive antenna was computed using the techniques described above. The packet-detection delay of each packet using channel phase was also computed to gauge its effect on the measurement of time-of-flight.

The ground-truth location was determined using a combination of architectural drawings of the building and a Bosch GLM50 laser distance measurement tool, which measures distances up to 50 m with an accuracy of 1.5 mm. The ground truth time-of-flight is the ground truth distance divided by the speed of light.

Figure 7:
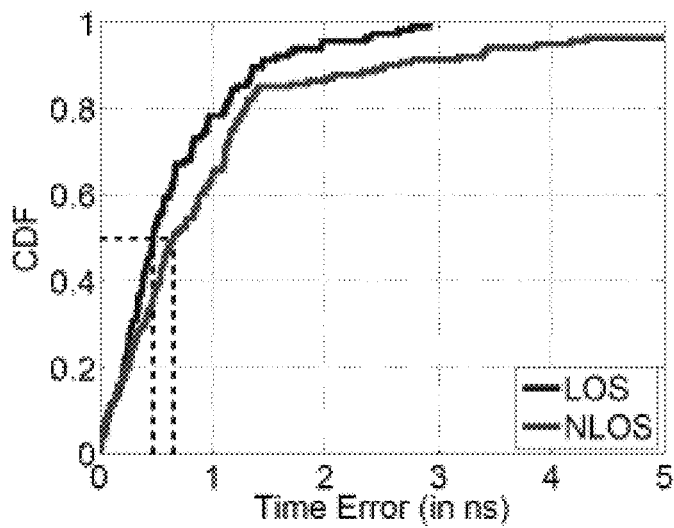
FIG. 7 is a cumulative distribution function (CDF) of error in time-of-flight between two devices in Line-of-Sight (LOS) and Non-Line-Of-Sight (NLOS) conditions.

Time-of-Flight Results: We first evaluate the system's accuracy in time-of-flight. FIG. 7 depicts the CDF of the time-of-flight of the signal in line-of-sight settings and non-line-of-sight. We observe that the median errors in time-of-flight estimation are 0.47 ns and 0.69 ns respectively. These results show that the system achieves its promise of computing time-of-flight at sub-nanosecond accuracy.

Figure 8:
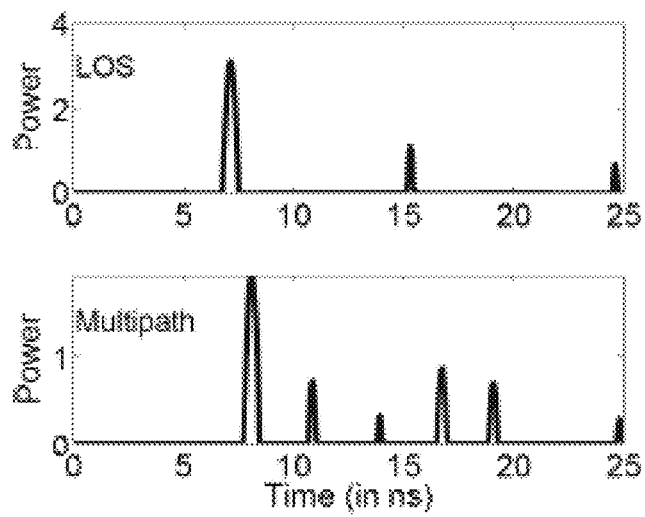
FIG. 8 is an example of a time profile in a LOS and a NLOS condition.

Multipath Profile Results: To examine whether multiple path profiles are indeed sparse, the candidate multipath profiles computed by the system were plotted. FIG. 8 plots representative multipath profiles in line-of-sight (LOS) and multipath (NLOS) environments. We note that both profiles are sparse, with the profile in multipath environments having five dominant peaks. Across all experiments, the mean number of dominant peaks in the multipath profiles is 5.05 with standard deviation 1.95—indicating that they are indeed sparse. As expected, the profile in a line-of-sight condition has even fewer dominant peaks than the profile in multipath settings. In both cases, we observe that the leftmost peaks in both profiles correspond to the true location of the source. Further, we observe that the peaks in both profiles are sharp due to two reasons: 1) the system effectively spans a large bandwidth that includes all WiFi frequency bands, leading to high time resolution; 2) the system's resolution is further improved by exploiting sparsity that focuses on retrieving the sparse dominant peaks at much higher resolution, as opposed to all peaks.

Figure 9:
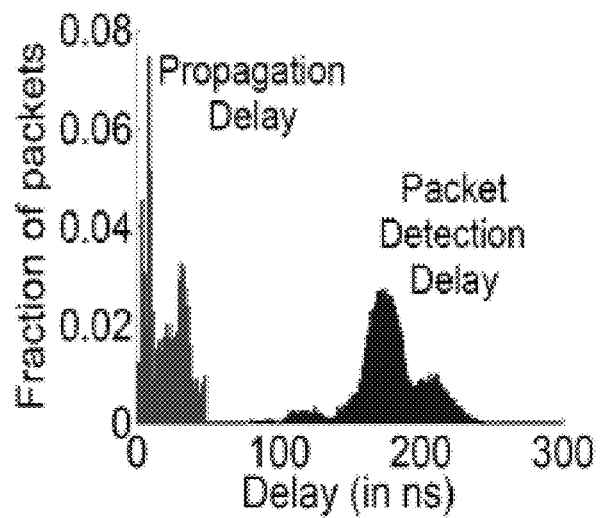
FIG. 9 is histogram of time-of-flight and packet detection delay.

Packet Detection Delay Results: As described above, the system uses a novel way for separating the detection delay from the time-of-flight. FIG. 9 depicts histograms of both packet detection delay and time-of-flight across experiments. The system observes a median packet detection delay of 177 ns across experiments. We emphasize two key observations: (1) Packet detection delay is nearly 8×larger than the time-of-flight in our typical indoor testbed. (2) Packet delay varies dramatically between packets, and has a high standard deviation of 24.8 ns. In other words, packet detection delays are large, highly variable, and hard to predict. This means that if left uncompensated, these delays could lead to a large error in time-of-flight measurements. Our results therefore reinforce the importance of accounting for these delays and demonstrate the system's ability to do so.

Figure 10:
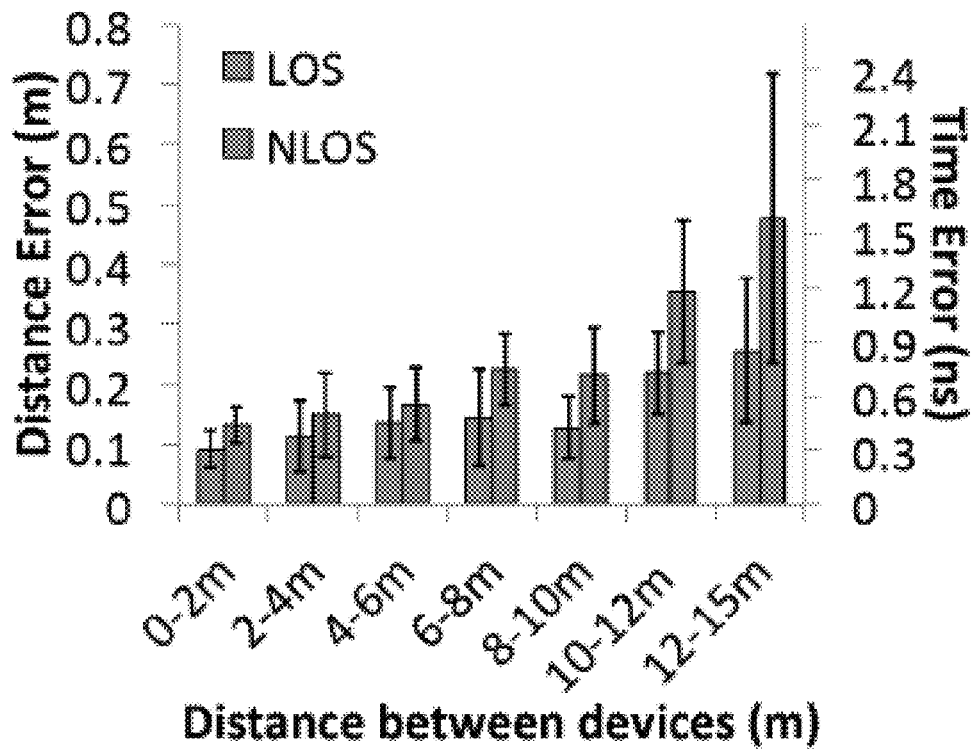
FIG. 10 is is a plot of error in distance across the true distance separating the transmitter from the receiver.

The systems's accuracy in measuring distance and location using a single access point was also evaluated. The time-of-flight between the access point and user client was measured in the testbed as described. FIG. 10 plots the median and standard deviation of error in distance computed between the transmitter and receiver against their true distance. We observe that this error is initially around 10 cm and increases to at most 26 cm at 12-15 meters. The increase is believed due to reduced signal-to-noise ratio at further distances. Note that the ranging accuracy is higher than the localization accuracy because ranging is a more direct problem (no need to find the exact direction) and the system's time-of-flight computation naturally yields the range between devices.

Figure 11:
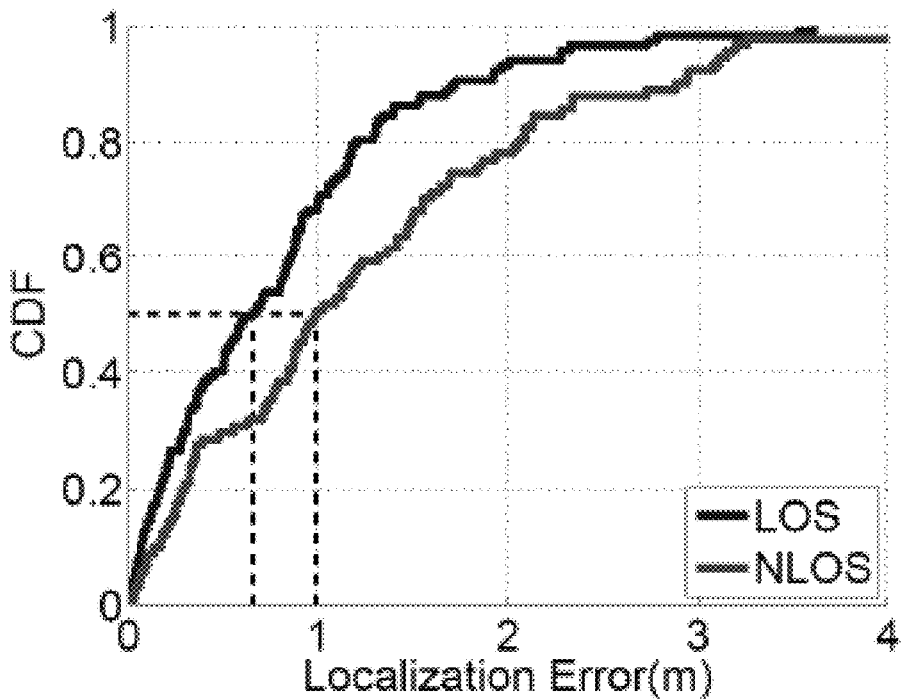
FIG. 11 is is a plot of CDF of localization error in Line-of-Sight (LOS) and Non-Line-of-Sight (NLOS).

FIG. 11 plots a CDF of localization error using the system in different settings. The device's median positioning error for line of sight scenarios is 65 cm and 98 cm in line-of-sight and non-line-of-sight. This result shows that the system's accuracy is comparable to state-of-the-art indoor localization that use multiple access points.

7 Applications

The approaches described above can be used in a variety of applications that can take advantage or accurate range measurements and/or accurate locatization based on accurate range measurements. Such applications can include:

Smart Home Occupancy: the system can be used to track the number of occupants in different rooms of a home using a single access point—a key primitive for smart homes that adapt heating and lighting. Experiments conducted in a 2-bedroom apartment with 4 occupants show that the system maps residents in a home to the correct room they are in with an accuracy of 94.3%;

WiFi Geo-fencing: the system can be used by small businesses with a single access point to restrict WiFi connectivity to customers within their facility. Experiments in a coffee house reveal that the system achieves this to an accuracy of 97%; and Personal Drone: the system's ability to locate a pair of user devices can directly benefit the navigation systems of personal robots such as recreational drones. The system enables personal drones that can maintain a safe distance from their user by tracking their owner's handheld device. Our experiments using an AscTec Quadrotor reveal that it maintains the required distance relative to a user's device with a root mean-squared error of 4.2 cm.

It is to be understood that the foregoing description is intended to illustrate and not to limit the scope of the invention. Other embodiments are within the scope of the appended claims.

APPENDIX

Inverting the NDFT

The Non-uniform Discrete Fourier Transform (NDFT) is an under-determined system, where the responses of multiple frequency elements are unavailable. Thus, the inverse of such a Fourier transform does not have a single closed-form solution, but rather has several possible solutions.

The system solves for the inverse-NDFT by adding a constraint to the inverse-NDFT optimization. Specifically, this constraint favors solutions that are sparse. IN the context of ranging, such sparcity relates to there being few dominant signal paths. Intuitively, this stems from the fact that while signals in indoor environments traverse several paths, a few paths tend to dominate as they suffer minimal attenuation. In some examples, the sparsity of indoor multipath profiles in typical line-of-sight and non-line-of-sight settings is empirically evaluated.

The sparsity constraint mathematically is formulated as follows. Let the vector p sample inverse-NDFT at m discrete values $\tau \in \{\tau_1, \ldots, \tau_m\}$. Then, we can introduce sparsity as a simple constraint in the NDFT inversion problem that minimizes the L-1 norm of p. Indeed, it has been well-studied in optimization theory that minimizing the L-1 norm of a vector favors sparse solutions for that vector. Thus, we can write the optimization problem to solve for the inverse-NDFT as:

$$\min \|p\|_1 \tag{13}$$

$$s.t. \|\tilde{h} - \mathcal{F} p\|_2^2 = 0 \tag{14}$$

where, $\mathcal{F}$ is the n×m Fourier matrix, i.e. $\mathcal{F}_{i,k} = \exp(-j2\pi f_{i,0} \tau_k)$, $\tilde{h} = [\tilde{h}_{i,0}, \ldots, \tilde{h}_{n,0}]^T$ is the n×1 vector of wireless channels at the n different center-frequencies $\{f_{1,0}, \ldots, f_{n,0}\}$, $\|\cdot\|_1$ is the L-1 norm, and $\|\cdot\|_2$ is the L-2 norm. Here, the constraint makes sure that the Discrete Fourier Transform of p is $\tilde{h}$, as desired. In other words, it ensures p is a candidate inverse-NDFT solution of $\tilde{h}$. The objective function favors sparse solutions by minimizing the L-1 norm of p.

The above optimization problem is reformulated using the method of Lagrange multipliers as:

$$\min_p \|\tilde{h} - \mathcal{F} p\|_2^2 + \alpha \|p\|_1 \tag{15}$$

---
Algorithm 1 Algorithm to Compute Inverse NDFT
---

▷ Given: Measured Channels, $\tilde{h}$
▷ $\mathscr{F}$: Non-uniform DFT matrix, such that $\mathscr{F}_{i,k} = \exp(-j2\pi f_{i,0}\tau_k)$
▷ $\alpha$: SPARSITY parameter; $\epsilon$: Convergence Parameter
▷ Output: Inverse-NDFT, p ▷ Initialize $p_0$ to a random value, $t = 0$, $\gamma = \dfrac{1}{\|\mathscr{F}\|_2}$.

while converged = false do
  $p_{t+1}$ = SPARSIFY$(p_t - \gamma \mathscr{F}^*(\mathscr{F}p_t - \tilde{h}), \gamma\alpha)$
  if $\|p_{t+1} - p_t\|_2 < \epsilon$ then
    converged = true
    p = $p_{t+1}$
  else
    t = t + 1
  end if
end while
function SPARSIFY(p,t)
  for i = 1,2,...length(p) do
    if $|p_i| < t$ then
      $p_i = 0$
    else
      $p_i = p_i \dfrac{|p_i| - t}{|p_i|}$
    end if
  end for
end function

---

Notice that the factor $\alpha$ is a sparsity parameter that enforces the level of sparsity. A bigger choice of $\alpha$ leads to fewer non-zero values in p.

This objective function is convex but not differentiable. Our approach to optimize for it borrows from proximal gradient methods, a special class of optimization algorithms that have provable convergence guarantees. Specifically, our algorithm takes as inputs the measured wireless channels $\tilde{h}$ at the frequencies $\{f_{i,0}, \ldots, f_{n,0}\}$ and the sparsity parameter $\alpha$. It then applies a gradient-descent style algorithm by computing the gradient of differentiable terms in the objective function (i.e., the L-2 norm), picking sparse solutions along the way (i.e., enforcing the L-1 norm). Algorithm 1 summarizes these steps. the system runs this algorithm to invert the NDFT and find the multipath profile.

What is claimed is:

1. A method for determining a separation of two radio nodes, the method comprising:
receiving a first plurality of radio frequency transmissions from a second radio node to a first radio node, each transmission including a signal transmitted from the second radio node at a second location to the first node at a first location, the first location and the second location being separated by a range, each transmission having a transmission frequency different than the transmission frequencies of other transmissions of the plurality of transmissions;
determining a constraint on the range from each of the transmissions, each constraint being consistent with a plurality of possible ranges, the plurality of possible ranges of the constraint being dependent on the transmission frequency of the transmission; and
combining the constraints determined from each of the transmissions to determine an estimate of the range.

2. The method of claim 1 wherein determining the constraint from a transmission comprises:
determining a phase difference at the transmission frequency between the signal transmitted at the second radio node and the signal received at the first radio node; and
determining the constraint on the range to be such that the range is substantially equal to a fraction of a wavelength plus a set of integer multiples of said wavelength, where the wavelength corresponds to the transmission frequency and the fraction corresponds to the determined phase difference.

3. The method of claim 2 wherein determining the constraint on the range comprises:
requiring that a propagation time, $\tau$, corresponding to said range be equal to $$-\frac{\angle h_i}{2\pi f_i} \mod \frac{1}{f_i}$$

for all the transmission frequencies $f_i$ of the transmissions and the corresponding determined phase differences $\angle h_i$.

4. The method of claim 2 wherein combining the constraints comprises:
determining a constraint on the range relative to a least common multiple of the wavelengths of the transmission frequencies.

5. The method of claim 2 wherein
each signal of at least some of the plurality of transmissions includes a plurality of components at a set of distinct non-zero frequency offsets from the transmission frequency, and
determining the phase difference at the transmission frequency includes determining a phase difference at each of the frequency offsets and extrapolating the phases differences at said frequency offsets to determine the phase difference at the transmission frequency.

6. The method of claim 5 wherein the signal comprises an Orthogonal Frequency Division Multiplexed (OFDM) modulation of data, and each component of the signal corresponds to a different component of the OFDM modulation.

7. The method of claim 5 wherein the plurality of radio frequency transmissions comprise wireless local area network transmissions.

8. The method of claim 2 wherein for each transmission from the second radio node to the first radio node, a transceiver frequency reference at the second radio node has a phase offset relative to a transceiver frequency reference at the first radio node, and determining the phase difference comprises mitigate an effect of the phase offset of the transceiver frequency references at the first and first radio nodes.

9. The method of claim 8 wherein mitigating the effect of the phase offset in determining the phase difference at the transmission frequency of a first transmission of the plurality of transmissions includes:
recording a first measurement at the first radio node characterizing a first phase difference of the signal of the first transmission;
making a second transmission at the transmission frequency of the first transmission from the first radio node to the second radio node;

recording a second measurement characterizing a second phase difference of the signal of the second transmission at the second radio node; and combining the first measurement and the second measurement to determine the phase difference between the second radio node and the first radio node at the transmission frequency.

10. The method of claim 9 wherein the first phase difference includes an additive factor corresponding to the phase offset, and the second phase difference includes an additive factor that is substantially the negative of the additive factor of the first phase difference, and where combining the first measurement and the second measurement includes adding the first phase difference and the second phase difference.

11. The method of claim 10 wherein combining the first measurement and the second measurement further includes mitigating an effect of delay between the first transmission and the second transmission.

12. The method of claim 11 wherein combining the first measurement and the second measurement include adding a factor corresponding to the delay between the first transmission and the second transmission.

13. The method of claim 1 wherein each transmission of the first plurality of transmissions has multiple paths between the second radio node and the first radio node, including a direct path having direct propagation time corresponding to the range between the second radio node and the first radio node, and one or more indirect paths having indirect propagation times greater than said direct propagation time.

14. The method of claim 13 wherein each constrain corresponds to a value in a frequency domain representation of the propagation times as a function of transmission frequency.

15. The method of claim 14 wherein combining the constraints comprises performing a transform computation using the values in the frequency domain representation of the propagation times.

16. The method of claim 15 wherein the transmission frequencies are non-uniformly spaced, and performing the inverse transform computation comprises performing a Non-uniform Discrete Fourier Transform (NDFT) computation.

17. The method of claim 15 wherein combining the constraints to determine the estimate of the range comprises determining a peak in a time-domain representation resulting from the transform computation with a smallest time.

18. The method of claim 1 wherein the plurality of radio frequency transmissions comprise wireless local area network transmissions.

19. The method of claim 1 wherein the plurality of radio frequency transmissions comprise multiple channel frequencies in multiple frequency bands of a wireless communication system.

20. The method of claim 1 wherein the plurality of radio frequency transmissions have transmission frequencies that span a range of at least a multiple of two between a lowest and a highest transmission frequency.

21. The method of claim 1 wherein the plurality of radio frequency transmissions have transmission frequencies that are not multiples of a common transmission frequency, and the transmission frequencies are not all regularly spaced.

22. Software stored on a non-transitory machine-readable media comprising instructions for causing one or more processors to:

process a plurality of radio frequency transmissions from a second radio node, each transmission having a transmission frequency of the plurality of frequencies different than the transmission frequencies of the other transmissions of the plurality of transmissions;

determine a constraint on a range from the second radio node from each of the transmissions, each constraint being consistent with a plurality of possible ranges, the plurality of possible ranges of the constraint being dependent on the transmission frequency of the transmission; and combine the constraints determined from each of the transmissions to determine an estimate of the range.

23. A radio node configured to determining a separation from a second radio node, the node comprising:

a radio receiver configured to receive transmissions at a first plurality of frequencies; and a processor configured to:

process a first plurality of radio frequency transmissions from a second radio node, each transmission having a transmission frequency of the first plurality of frequencies different than the transmission frequencies of the other transmissions of the plurality of transmissions;

determine a constraint on a range from the second radio node from each of the transmissions, each constraint being consistent with a plurality of possible ranges, the plurality of possible ranges of the constraint being dependent on the transmission frequency of the transmission; and combine the constraints determined from each of the transmissions to determine an estimate of the range.

* * * * *